United States Patent [19]

Wiesen

[11] Patent Number: 5,564,381
[45] Date of Patent: Oct. 15, 1996

[54] LIGHTWEIGHT ENGINE FRAME FEATURING INEXPENSIVE ENERGY SAVING CONSTRUCTION

[76] Inventor: Bernard Wiesen, 15 Beach Rd., Great Neck, N.Y. 11023

[21] Appl. No.: 334,551

[22] Filed: Nov. 7, 1994

Related U.S. Application Data

[62] Division of Ser. No. 107,253, Aug. 16, 1993, Pat. No. 5,362,154.

[51] Int. Cl.$^6$ .................................................. F02F 7/00
[52] U.S. Cl. ................................. 123/195 S; 403/171
[58] Field of Search ..................... 123/195 S, 195 C; 403/169, 170, 171, 176, 217; 92/146, 147

[56] References Cited

U.S. PATENT DOCUMENTS

| | | | |
|---|---|---|---|
| 936,451 | 10/1909 | Havenhill | 403/171 |
| 3,498,654 | 3/1970 | Diaz et al. | 403/217 |
| 3,901,613 | 8/1975 | Andersson | 403/171 |
| 4,235,559 | 11/1980 | Rooklyn | 403/171 |

*Primary Examiner*—Noah P. Kamen

[57] ABSTRACT

Arrangements are disclosed for a lightweight engine frame wherein weight reduction and manufacturing simplicity are obtained primarily through the use of skeletal box frames fabricated from extruded material joined at their ends forming a unique double lap joint assembly without the need for additional components. The disclosure describes the inventions advantageous corner construction which permits simple assembly with a minimum of tools. Also the described construction may be combined with a sound-proofed exterior shell. Shown is an engine of the axial type, but similar constructions may be employed for other engine types, as well as transmission cases and where precise frame structures are required and the use of this invention may be an economic alternative.

7 Claims, 7 Drawing Sheets

5,564,381

LIGHTWEIGHT ENGINE FRAME FEATURING INEXPENSIVE ENERGY SAVING CONSTRUCTION

This is a Division of Ser. No. 08/107,253 Filed Aug. 16, 1993, now U.S. Pat. No. 5,362,154.

BACKGROUND—FIELD OF THE INVENTION

This invention relates to engine frame components and more particularly, to such frame components which may be formed from an extruded material, such as aluminum, but is not limited to that metal or any other material.

BACKGROUND—DESCRIPTION OF PRIOR ART

Conventional structures manufactured for use as fluid-tight frames, such as engine blocks, crankcases, transmission cases and the like, particularly for use as prototypes, models, and in cases of limited production, are usually constructed with castings which need extensive machining and finishing. These structures require the design and manufacture of patterns just to deliver the first prototype, which often does not reach production, thereby wasting a great deal of time and expense.

Attempts to substitute castings using welded plates have many disadvantages, since this technique requires the use of skilled labor, is very time-consuming and difficult to produce precisely even in limited numbers.

The coupling of struts effected by the use of corner elements makes the manufacture and construction complicated and expensive and cannot produce a precise or fluid-tight structure.

The welding of corners restricts the construction of such structures to weldable materials, which in most cases tend to bend and warp, and in others spoil the surface finish of the joined materials. Joints between the components have not been satisfactory from the standpoint of rigidity, precision or appearance.

To date, the only truly soundproof engines have required a separate structure to inhibit the noise emitted from them.

The present invention was conceived to overcome these and other deficiencies and inadequacies and provides an improved and novel construction which is commercially practical and usable.

OBJECTS AND ADVANTAGES (a) to provide a unique double lap joint connecting system to assemble extruded struts into a skeletal box frame that permits the entrance holes of its connecting fasteners to be used after assembly as connecting points to attach supporting components and cover plates to complete a structural frame assembly;

(b) to provide an engine frame construction of the type specified in which the parts can be easily and accurately manufactured that requires a fraction of the energy needed to produce conventional designs with superior surfaces which do not require further machining;

(c) to provide an engine structure of the character specified having the frame and cylinder and shaft supporting surfaces so relatively constructed and arranged that the cylinders and shaft will be accurately located and positioned in the frame;

(d) to provide a skeletal box frame of high precision providing a fluid-tight rugged frame formed from extruded material presenting a uniform flush exterior, with precise dimensions and smooth flat seamless surfaces prepared for the attachment of cover plates and formers, permitting the assembly of its main components without visually revealing the method of assembly and without the need for special tools;

(e) to provide a unique engine frame assembly with associated sound proofing arrangements, eliminating the need for additional structures, in the interest of reducing cost, simplifying manufacture and assembly and producing a superior product that is totally compatible with its joined components and offers means to attach these components precisely in a uniform manner and in such positions that the operative parts of the engine will be readily accessible;

(f) the more general object of this invention is to provide an engine frame constructed of a minimum number of elements that combine to form a compact, lightweight and economical to manufacture structure.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which.

DETAILED DESCRIPTION OF THE INVENTION

Further details of the invention will appear from the following description.

Figure 1:
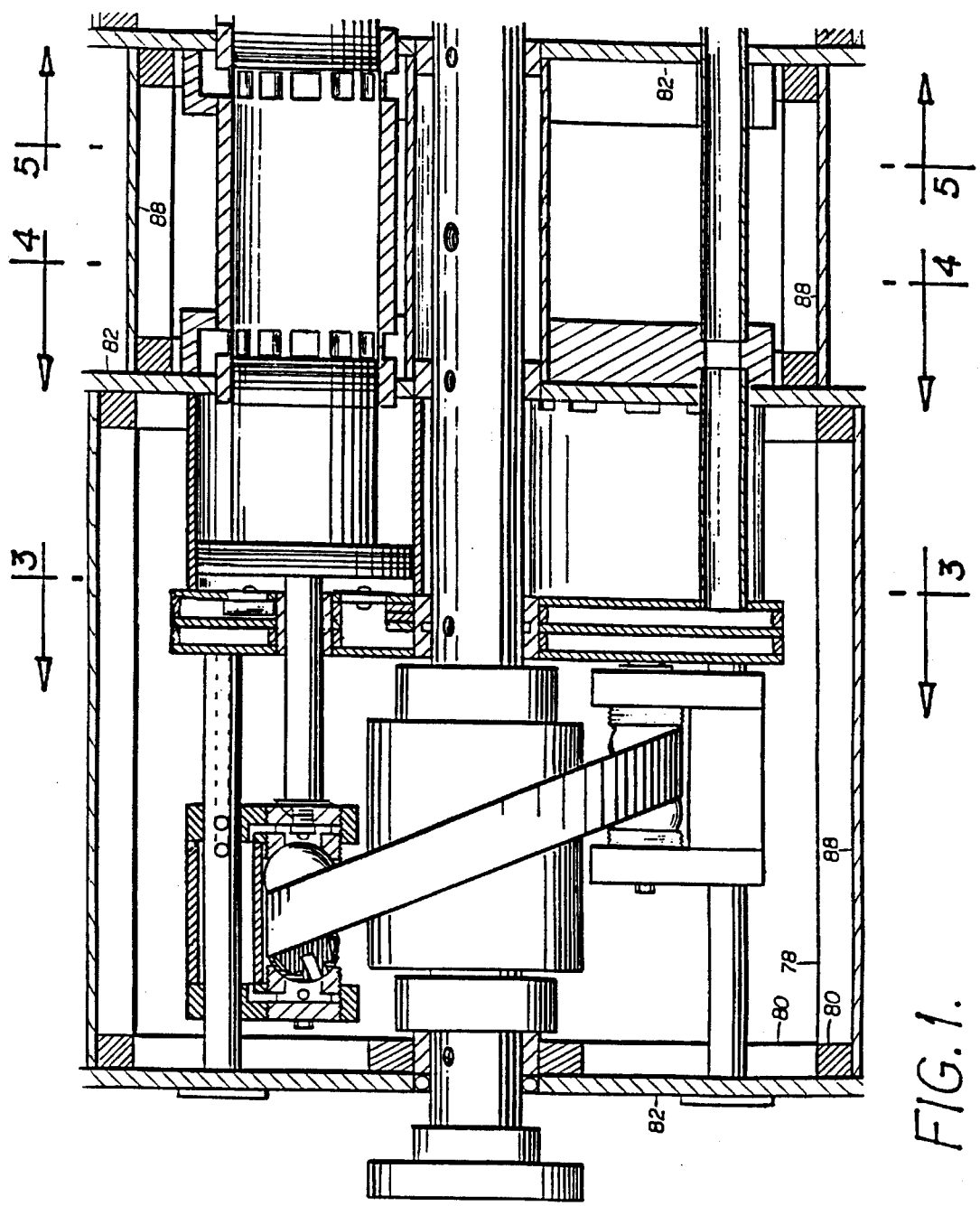
FIG. 1 is a view in section of a multi-cylinder axial engine taken on line 1—1 in FIG. 2 constructed in accordance with the present invention.
Figure 2:
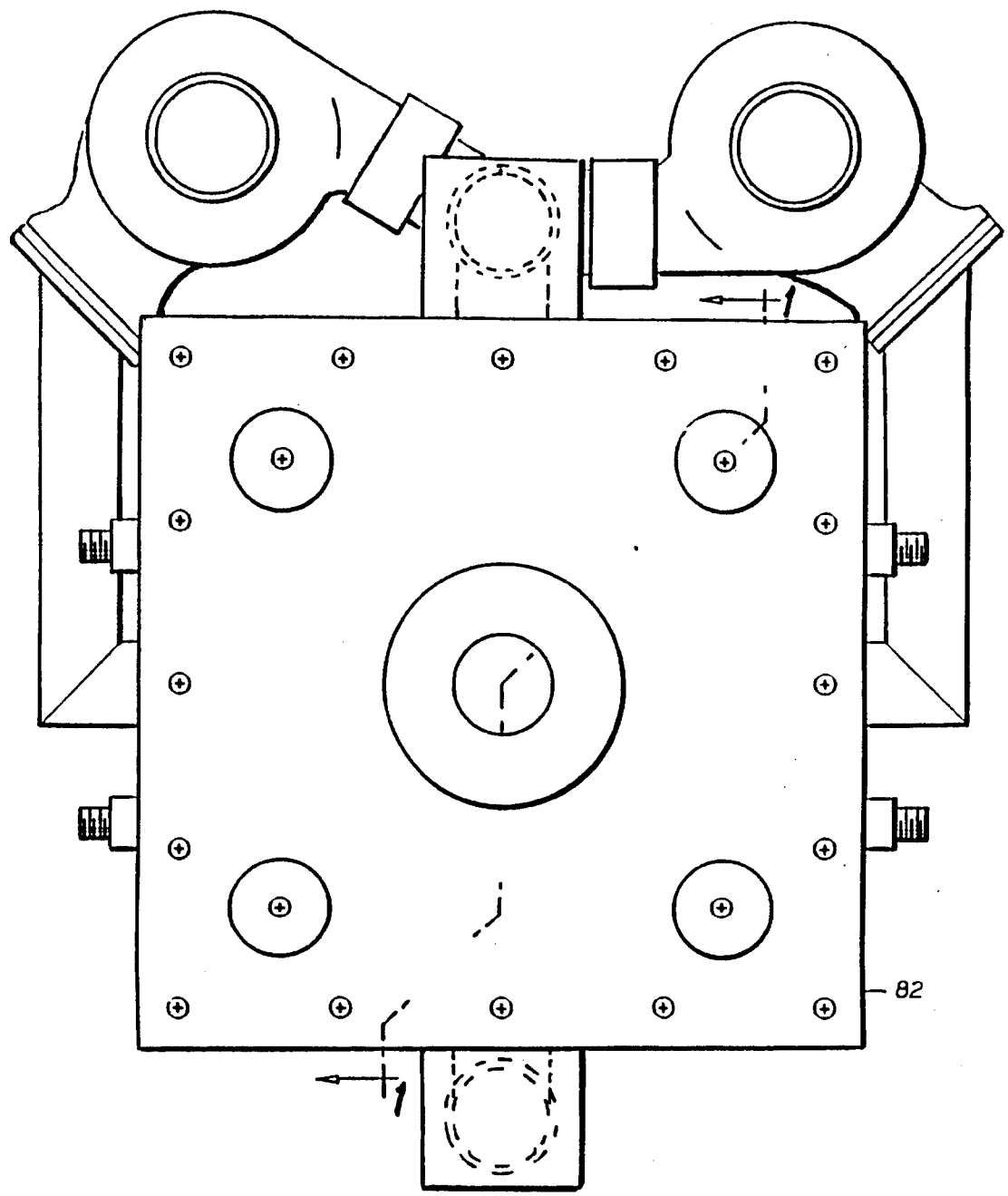
FIG. 2 is a front plan view of the invention constructed in accordance with the present invention.
Figure 3:
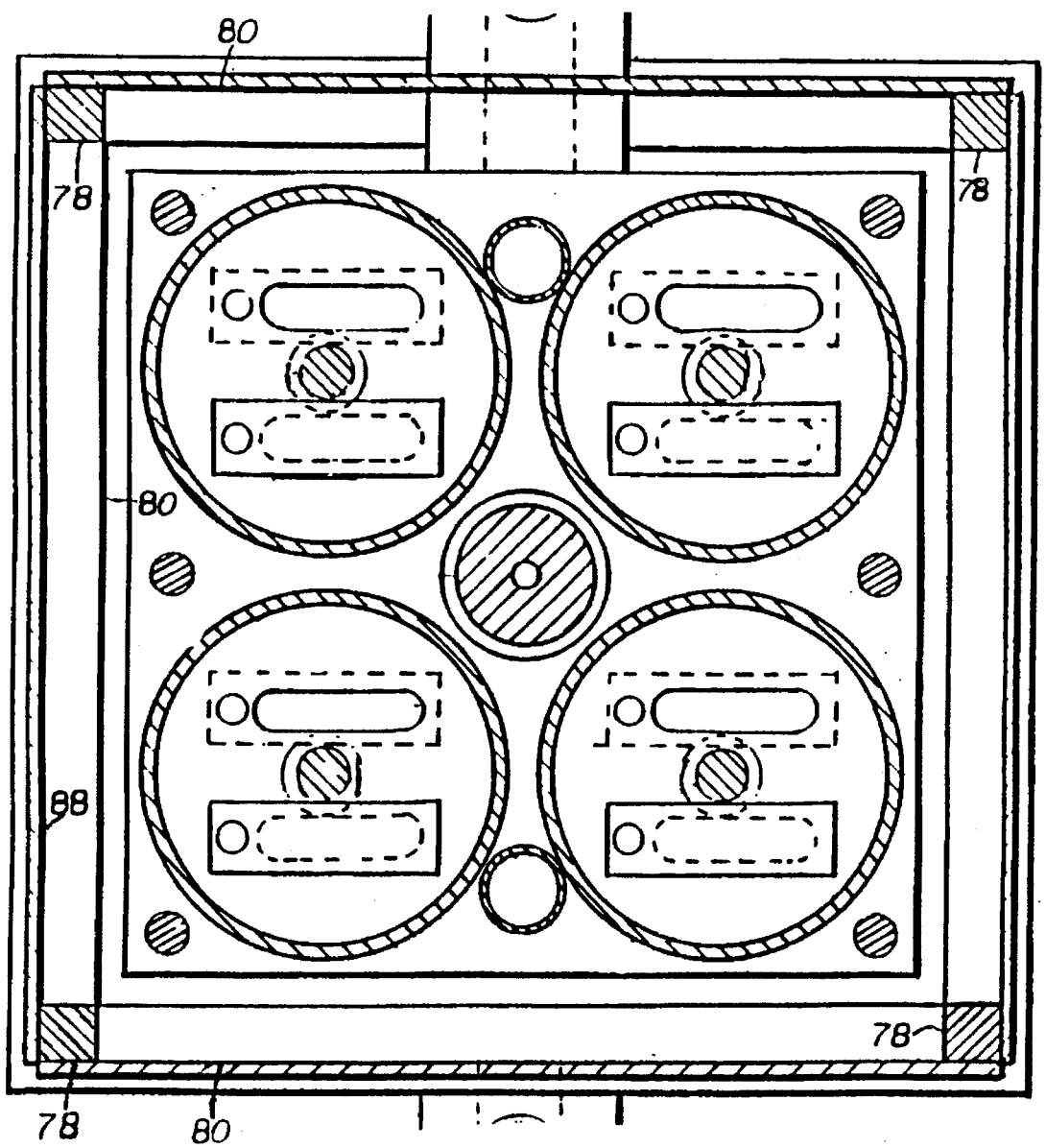
FIG. 3 is a view in section taken on line 3—3 of FIG. 1.
Figure 4:
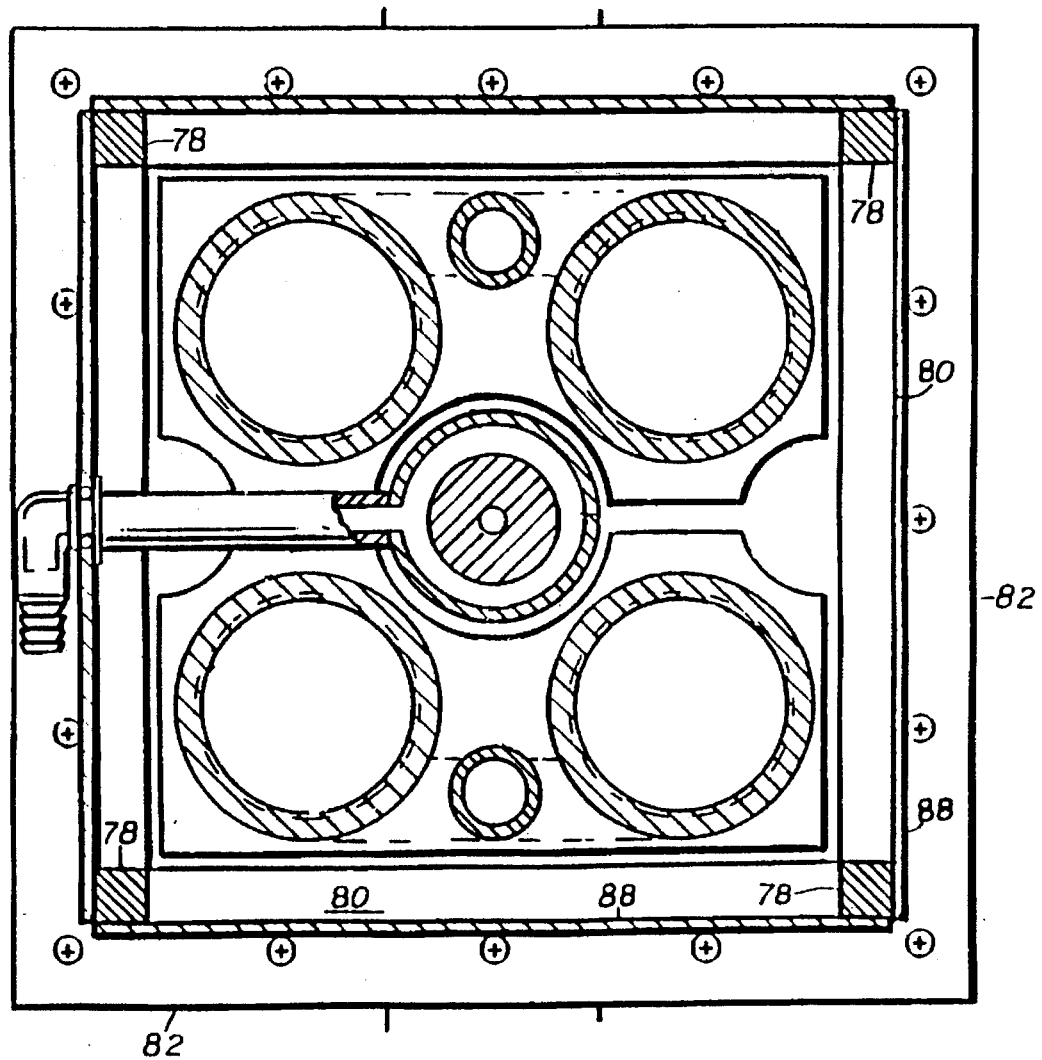
FIG. 4 is a view in section taken on line 4—4 in FIG. 1.
Figure 5:
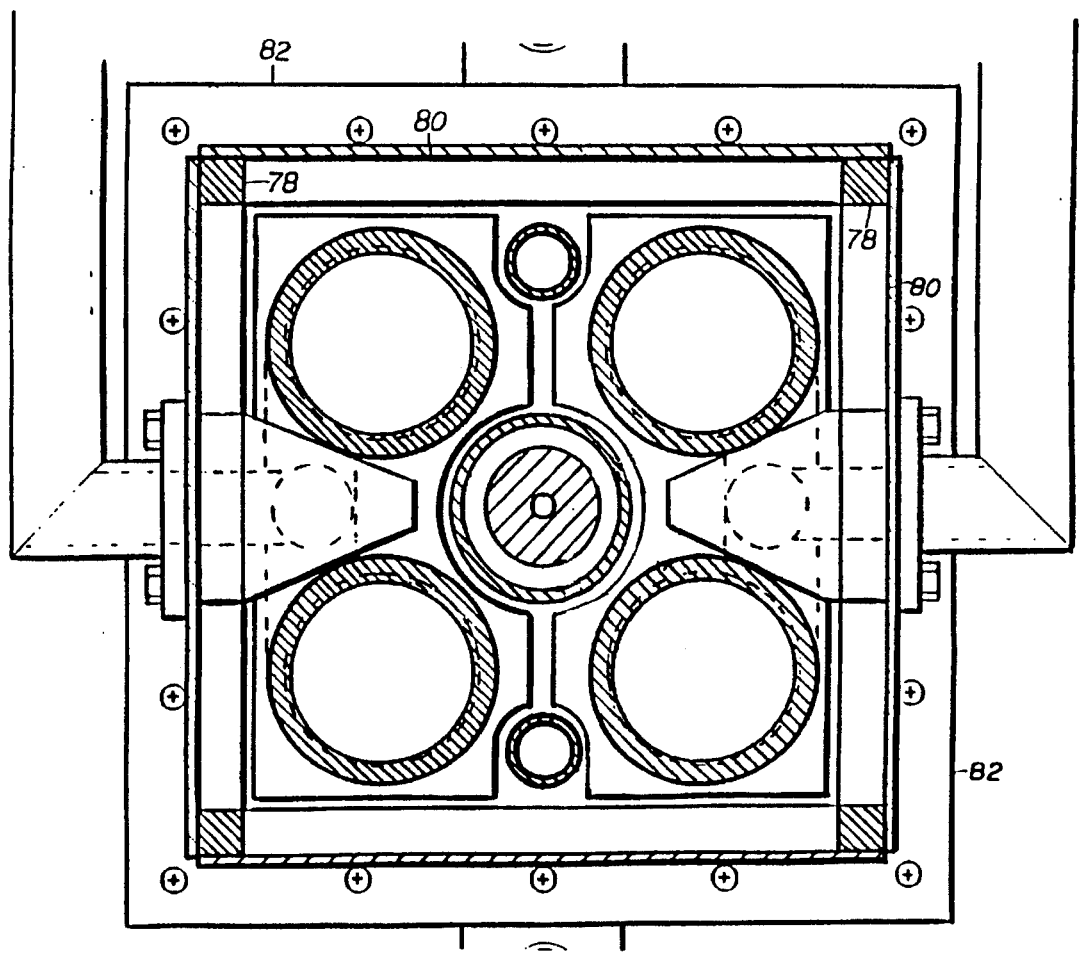
FIG. 5 is a view in section taken on line 5—5 in FIG. 1.
Figure 6:
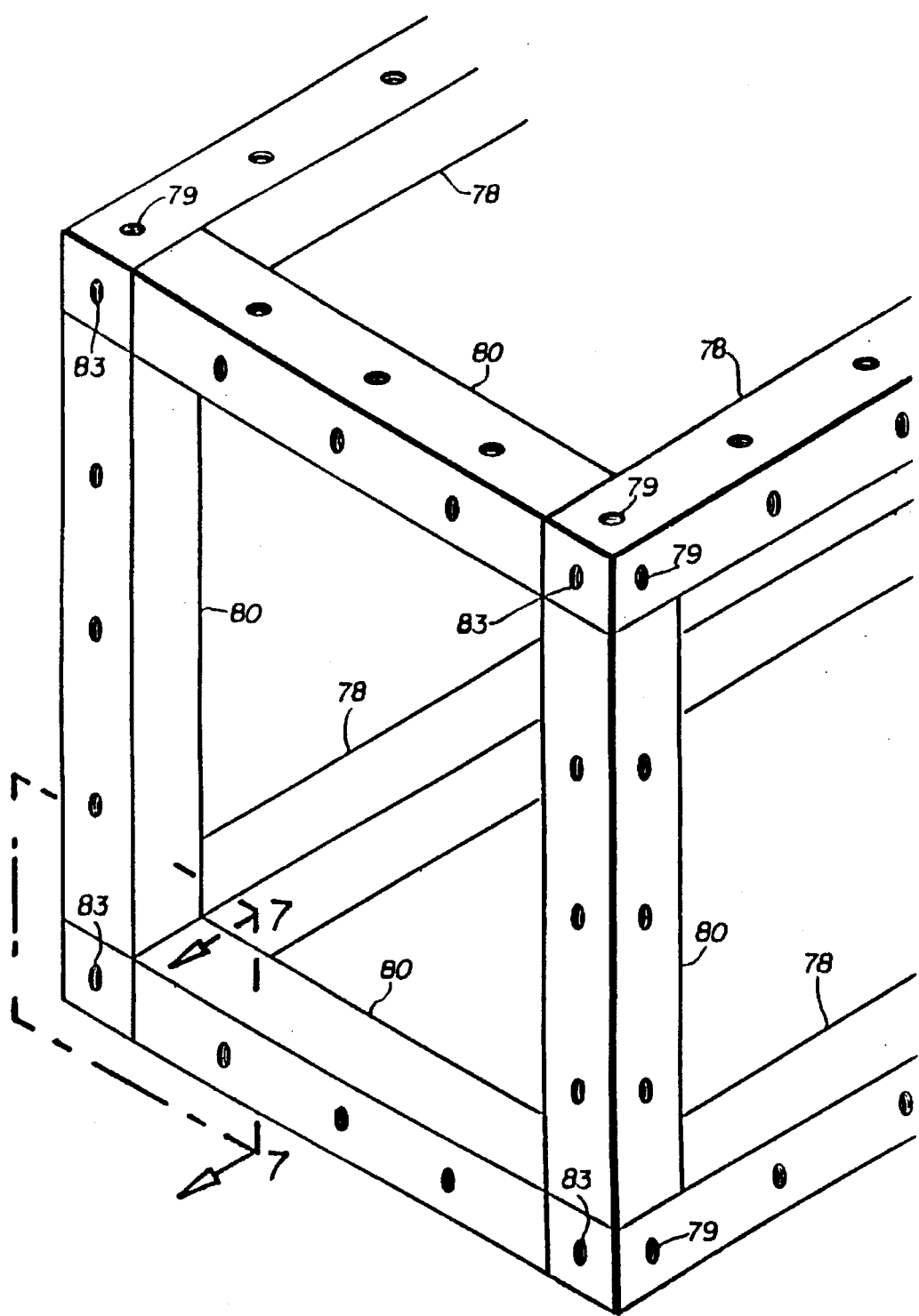
FIG. 6 is a partial perspective view of a skeletal box frame illustrating the double lap joint formed at each corner in accordance with the present invention.
Figure 7:
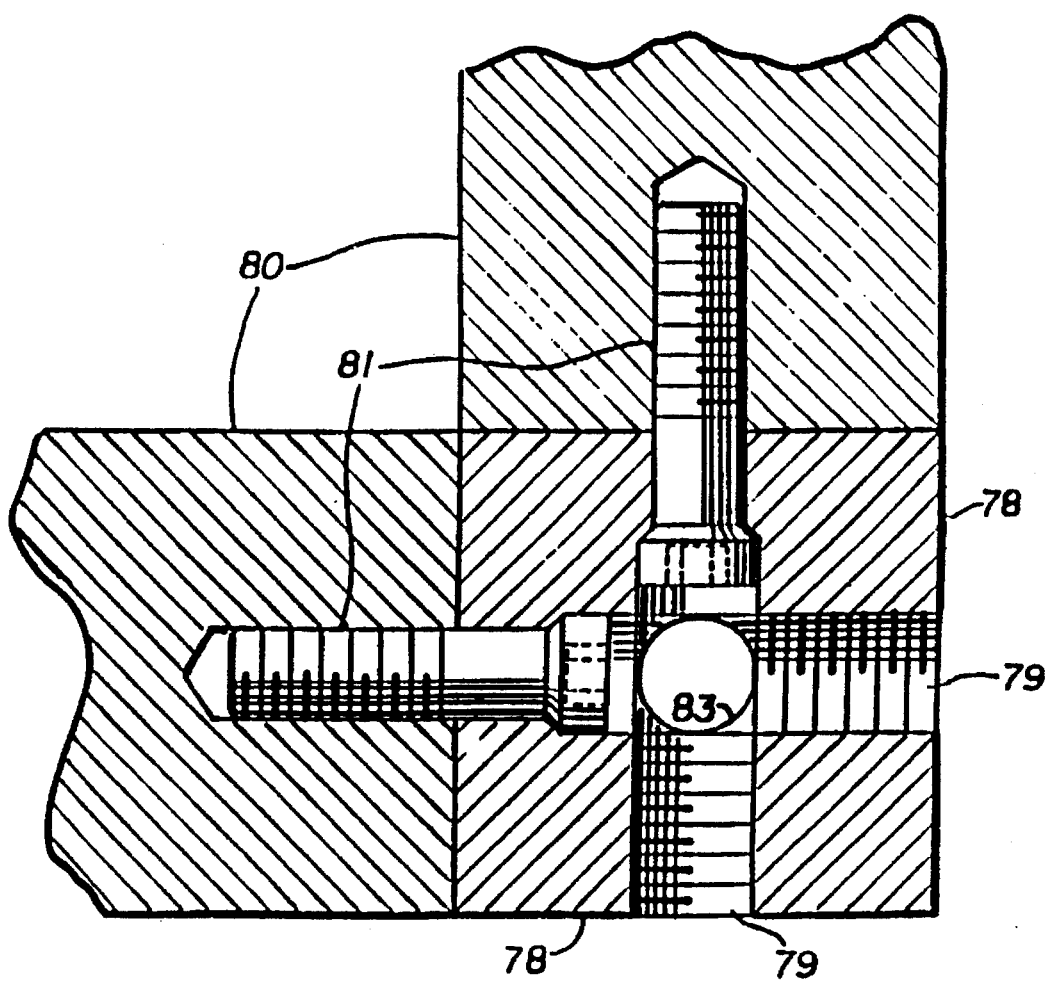
FIG. 7 is a view in section of a corner construction taken on line 7—7 in FIG. 6.

Referring to FIGS. 1–7 inclusive, four longitudinal struts 78 are joined at the ends of eight perpendicular struts 80 with fasteners 81 whose heads are a slip fit in the threaded entrance holes 79 joining fasteners 81 to ends of perpendicular struts 80, to form a six sided skeletal box frame whose dimensions are defined axially by formers 82. Longitudinal opening 83 is also threaded (thread not shown) to receive screw fasteners connecting former 82 to longitudinal strut 78. Three such assemblies are used to enclose and support the major parts and components of the engine shown. It should be understood that engine frames of the opposed cylinder, V and inline type may also be formed using similar elements. Cover plates 88 are employed to strengthen the assembly and are available as covers and access openings to all internal components. Formers 82 are employed to connect and define a plurality of frame assemblies. The corner joining fasteners 81 are concealed within the longitudinal strut 78 that laps the ends of two perpendicular struts 80. The threaded portion of the fasteners 81 passes through the longitudinal strut 78 and screws into end holes in the two perpendicular struts 80 at their ends. The heads of these fasteners 81 are just small enough (a slip fit) to pass through the minor diameter of the threaded entrance hole 79 in the longitudinal strut 78, but properly shaped to align with the countersink which defines the depth of travel of fastener 81 and permit its threaded portion to engage the end of perpendicular strut 80 at right angles to it, The fasteners are located in this unique arrangement to allow for the use of another fastener (not Shown) to pass between the heads of fasteners 81 in threaded opening 83 when the frame is assembled and permit the threaded entrance holes 79 to be used by screws for the attachment of cover plates.

SUMMARY, RAMIFICATIONS, AND SCOPE

The manufacture of the invention requires the use of a fraction of the energy needed to produce conventional designs and provides a strong and lightweight skeletal frame construction of low production cost. Consisting essentially of stock extrusions combined with simple plate material, producing an engine frame whereby the shaft, swashplates, pistons, cylinders, bearings and the reciprocating mechanism, may be readily assembled or removed through any of the frame openings.

An outstanding feature of the present invention is that the corner connecting arrangement forms an extremely strong assembly, which is concealed, and for practical purposes, invisible. The inside corners are neat and show no trace of any connection and permit the use of its entrance holes, (that are threaded) to be used for fasteners that mount cover plates, formers and other elements. In addition to the ease of manufacture and finish, is the advantage of easy assembly. The invention provides a maximum of rigidity and strength and produces a robust skeletal structure that permits an extremely accurate frame assembly that cannot be matched by any other fabrication method, and without the need for additional components. Cover plates made of or combined with noise-attenuating material may be employed. Never has an engine frame been so constructed to so easily allow for the complete embracement of its structure and contents with such materials.

In the manufacture of prototype engines, transmission cases and other structures, the investment required for patterns, forgings and castings is extremely high. The utilization of the frame construction described allows for the use of simple extrusions and plate material that permits the assembly of various configurations at a fraction of the usual prototype costs.

The unique structure and assembly method produces an extremely accurate product and reduces time and costs. The struts may be extruded with the center holes partly formed and with other openings formed axially to further lighten the assemblies. Therefore it should not be considered exclusively for use as an engine frame, but might be appropriately extended to other uses, such as transmission cases, gear boxes and in other areas where a rugged and simple to assemble structure can be an economic alternative. The struts 78 and 79 can be made in a variety of sizes and sold in kit form, with the special fasteners, 81.

Thus the scope of the invention should be determined by the appended claims and their legal equivalents, rather than by the examples given.

The embodiments of the invention for which an exclusive property or privilege is claimed are defined as follows:

I claim:

1. A mechanism comprising at least one box frame for securing together at least one piston adapted to reciprocate within a cylinder and operatively connected to a rotatable shaft, the frame comprising:

a plurality of struts each defining an edge of said box, said struts arranged at their ends in a double lapped configuration and secured by fastening means to define corners of said box, a plurality of holes in said struts, wherein some of said holes hold said fastening means and a plurality of plates defining sides of said box and detachably secured to said struts.

2. The mechanism according to claim 1, wherein said piston, cylinder and shaft comprise an internal combustion engine.

3. The mechanism according to claim 1, wherein said plates are adapted to absorb noise emanating from the mechanism.

4. The mechanism according to claim 1, wherein said plates are secured by screws and provide a fluid tight enclosure.

5. The mechanism according to claim 1, wherein said piston reciprocates along an axis parallel to said shaft.

6. The mechanism according to claim 1, wherein said mechanism comprises a plurality of said frames that are joined together by formers, said formers also securing other elements of said mechanism.

7. A box frame construction comprising:

four solid parallel longitudinal struts connected directly at their ends with eight solid perpendicular struts of similar profile, each of said struts defining an edge of said box, forming a corner construction of a double lap joint configuration and secured by fastening means to define corners of said box, a plurality of stepped holes comprising a wider portion and a narrower portion in said longitudinal struts arranged at right angles to each end of said perpendicular struts, with said fastening means in said narrow portion of said stepped holes of said longitudinal struts and extending into ends of said perpendicular struts, with said wider portion of said stepped holes being threaded so as to attach formers, plates and other elements.

\* \* \* \* \*